Patented Sept. 4, 1923.

1,466,888

UNITED STATES PATENT OFFICE.

LILLY S. MORRISSEY, OF RICHMOND HEIGHTS, MISSOURI.

WATER-SHEDDING COMPOUND FOR GLASS WINDSHIELDS.

No Drawing.　　　Application filed October 8, 1921.　Serial No. 506,363.

*To all whom it may concern:*

Be it known that I, LILLY S. MORRISSEY, a citizen of the United States of America, and a resident of Richmond Heights, in the county of St. Louis and State of Missouri, have invented certain new and useful Improvements in Water-Shedding Compounds for Glass Windshields, of which the following is a full, clear, and exact description.

This invention relates to improvements in water-shedding compounds for glass windshields. One of the objects of the invention is to produce a simple, inexpensive and highly efficient water-shedding compound adapted to be applied to a glass windshield in rainy weather, so as to effectively eliminate the water from the glass. To accomplish this, the glass should be thoroughly cleansed and a very thin film of the water-shedding compound should adhere to the clean surface of the glass. The compound therefore includes a cleansing agent combined with a thick viscous oily liquid adapted to be spread in the form of an extremely thin adhesive film on the surface of the windshield. This film is transparent and it prevents the water from engaging and adhering to the glass. The drops of water striking the water-shedding film are immediately discharged from the windshield. Furthermore, the transparent compound is non-volatile and the film will remain on the windshield for a long period of time.

Another advantage of the compound lies in the fact that it will adhere to the surface of the glass, and if properly applied it will not collect dust, so it is not necessary to remove the compound from the windshield.

To obtain the most satisfactory results, the ingredients of the compound should be properly proportioned, and I have found that if too much, or not enough, of the compound is applied to the windshield it will not effectively perform its function. The compound is applied to a body of absorbent material, preferably cheese cloth, which is used to wipe the windshield, and if the cloth is oversaturated with the compound it will streak, or blur, the glass. On the other hand, enough of the compound must be used to form the desired thin transparent film on the glass.

To set forth the preferred form of the invention, I will disclose the proportions of the ingredients for an entirely satisfactory compound, and I will point out the volume of the compound to be applied to a given area of cheese cloth. Obviously, it would be difficult for the user to carefully prepare the cloth for each wiping operation, and an object of the invention is to produce a windshield cleaner of this kind, consisting of a body of absorbent material properly impregnated with the new compound. I thereby produce a new article of manufacture, ready for use on a windshield, and it is not necessary for the user to add anything to the new windshield clearing device. The impregnated cloth constituting this new article can be conveniently enclosed in a non-absorbent envelope, and it can be used repeatedly for a long period of time.

The ingredients of the compound may be as follows:

Glycerine_____ 50 %
Water_____ 37½%
Ammonia_____ 12½%

I have found that entirely satisfactory results can be obtained by using less water and more ammonia, but it is of course desirable to reduce the cost to a minimum, and it is not necessary to use more than 12½% of ammonia, which may be ordinary household ammonia.

The ammonia and water are very effective cleansing agents and the glycerine is a transparent non-volatile, viscous, oily liquid having adhesive properties that enable the compound to adher to the surface of the glass. The ammonia and water serve as a thinner for the glycerine, so a very thin uniform film of the compound can be applied to the glass, and actual experience has shown that this transparent and non-volatile film will not be washed away when exposed to rain, and that it will effectively shed the rainwater and maintain the windshield in a clear condition.

All of these results can be accomplished if the compound is properly applied to the windshield, and the invention therefore includes a water-shedding appliance in the form of a wiping device having all of the elements essential to the successful and convenient use of the compound. To avoid streaks, or blurs, on the windshield and at the same time form a thin coherent film on the windshield, the compound should be first absorbed in a cloth, or the like, such as cheese-cloth, and this absorbent material should be properly impregnated with the compound. Too much, or not enough, of the compound in the absorbent material will fail to produce the most desirable results. I have found that all of the results herein set forth can be obtained from a wiping device consisting of the following combination of elements.

One half teaspoon of ammonia and one and one-half teaspoons of water, commingled with two teaspoons of glycerine and absorbed in a sheet of cheese-cloth 18 inches square. The new article produced by this combination of elements is ready for use without further treatment of any kind.

I claim:

1. A water-shedding compound for glass windshields comprising glycerine approximately 50 per cent, ammonia less than 25 per cent and water more than 25 per cent.

2. As a new article of manufacture, a device for clearing glass windshields comprising a sheet of absorbent fabric impregnated with a water-shedding compound including glycerine, ammonia and water, the volume of glycerine being approximately 50 per cent of said mixture.

3. As a new article of manufacture a device for clearing windshields comprising a sheet of cheese-cloth impregnated with a water-shedding compound including glycerine about 50 per cent, water more than 25 per cent, and ammonia less than 25 per cent.

In testimony that I claim the foregoing I hereunto affix my signature.

LILLY S. MORRISSEY.